United States Patent [19]

Dubrosky

[11] Patent Number: 4,683,912

[45] Date of Patent: Aug. 4, 1987

[54] ROTARY COUPLER FOR A ROBOT

[75] Inventor: Harry A. Dubrosky, Livonia, Mich.

[73] Assignee: General Motors Corporation, Detroit, Mich.

[21] Appl. No.: 836,553

[22] Filed: Mar. 6, 1986

[51] Int. Cl.$^4$ .................. F16L 39/04; B25J 17/02
[52] U.S. Cl. ................... 137/580; 285/134; 285/136; 901/29
[58] Field of Search ............ 137/580; 901/29, 41; 285/134, 136, 133.1

[56] References Cited

U.S. PATENT DOCUMENTS

| | | | |
|---|---|---|---|
| 2,308,137 | 1/1943 | White | 137/580 |
| 3,381,704 | 5/1968 | Richardson | 137/580 X |
| 3,698,433 | 10/1972 | Dobler et al. | 137/580 X |
| 3,776,270 | 12/1973 | Wanger | 137/580 |
| 4,040,338 | 8/1977 | Wilson et al. | 137/580 X |
| 4,126,336 | 11/1978 | Ortloff et al. | 285/136 |
| 4,186,763 | 2/1980 | Ferguson et al. | 285/136 X |
| 4,478,247 | 10/1984 | Alber | 137/580 |
| 4,496,279 | 1/1985 | Langer | 901/29 X |
| 4,570,978 | 2/1986 | Arendt | 285/134 X |

Primary Examiner—Alan Cohan
Assistant Examiner—John A. Rivell
Attorney, Agent, or Firm—Ernest E. Helms

[57] ABSTRACT

The present invention provides a rotary fluid coupler for attachment to a robot arm. The present inventive apparatus and method allows the coupling to connect in a nonconcentric manner a plurality of separate fluid streams allowing the outer shell of the coupler to be fixably attached or restrained from angular movement by the robot arm and having an inner portion adaptable for connection to a rotatable wrist of a robot for a complete 360 degree rotation.

22 Claims, 5 Drawing Figures

ROTARY COUPLER FOR A ROBOT

BACKGROUND OF THE INVENTION

The present invention relates generally to rotary fluid couplers. More particularly this invention relates to a rotary fluid coupler capable of handling a plurality of separate fluid streams. Still more particularly the present invention relates to a rotary fluid coupler suitable for use on a robot having a rotatable wrist at the end of the robot's arm extension.

DISCLOSURE STATEMENT

Presently robots are commonly used in the application of multiple fluids to a given surface. A prime example of the above is the use of robots to apply two component adhesives to automotive windshields.

Prior to the present invention an applicator was typically placed at the end of a robot arm. A fluid supply line would connect the robot applicator with a fluid supply pump. During the various processes of operation, the robot arm was often articulated in a multitude of different angles and extensions. Therefore to prevent a cut off in flow due to entanglements of the fluid supply line, the fluid supply line typically had a greater length than absolutely necessary to connect the fluid pump with the applicator.

Robots which have a rotatable wrist at the end of their arm extension require even greater lengths of supply lines due to the constant winding and unwinding of the fluid supply line. One primary inconvenience of such long supply lines is the potential for entanglement with other machines and work parts in the robot's immediate environment.

The above problem is multiplied when the robot is used to apply a multitude of fluids. Adding still more complexity to the problems already mentioned are robots which not only apply separate fluids but required pneumatic assistance for spraying the fluids and/or for supplying air to the pneumatic valves controlling the application of fluid from the applicators.

SUMMARY OF THE INVENTION

In an attempt to help cleanse the environment around the robot and to alleviate the other problems associated with the prior art such as fluid line fatigue from being continuously coiled and/or the cost associated with long fluid supply lines, the present invention is brought forth. The present invention provides a rotary coupler for use on a robot arm which provides a plurality of noncomingling fluid connections from a portion which can be fixed with respect to the robot arm to an end applicator which is capable of rotational movement by the robot.

The inventive coupler has an outer shell which is fluidly connected with the various fluid supply lines. Rotatably mounted within the outer shell is an inner shell. Between the inner and outer shell is a generally aperture shaped sealed clearance for each desired transmitted fluid. Fluidly connected with the clearance is an eccentric axial bore internally drilled within the inner shell. The inner shell is made up of at least two separate members which are fixably attached. Inserted within the inner shell member's common eccentric axial bore is a tubular insert which is sealed within the bore at both of the tubular insert's ends.

To allow for general maintenance and replacement of the various seals, the inner shell can be broken apart. In the preferred embodiment the tubular insert(s) are metallically joined, by welding or soldering, to the inner shell element most remote from the robotic arm. The opposite end of the tubular insert may be sealed by a single O-ring. Therefore the double O-rings that would be necessary to seal the fluid path past the mating surfaces of the various inner shell members can be eliminated.

The present invention is advantageous in that it allows in its preferred embodiment a plurality of separate noncomingling fluids paths from a rotationally fixed portion rotatably fixed with respect to the robot to an applicator which is rotated by a wrist of the robot. The present invention allows the fluid supply lines to the robot to be shortened and to undergo less strain. Another major advantage of the present invention is that it provides a plurality of separate fluid paths without requiring the plurality of fluid paths to be concentric with one another as in many prior rotary couplers. Still another advantage of the present invention is that it can provide 4, 5, 6, or even 8 separate fluid paths in a coupler having a relatively small diameter and weight. The light weight feature allows the inventive rotary coupler to be utilized on smaller, less expensive robots. The inventive coupler also allows the use of a single robot where two robots were previously required due to the plurality of fluid utilized in a given operation.

The present invention is also advantageous in that it may be easily broken down for maintenance or for replacement of various seal elements. Finally the present invention is advantageous in that it allows for the coupler to have a separate inner bore which may be reserved for fluid transmittal of other fluids or for the placement of electrical lines leading from the robot to sensoring elements at the end of the applicators.

It is an object of the present invention to provide a rotary coupler for a robot arm which has an outer shell fitted over a multipiece inner shell wherein the outer shell has a plurality of conduits which are fluidly connected with sealed clearances between said inner and outer shell, and wherein the sealed clearances between the inner and outer shell are fluidly connected with an axial eccentric bore which penetrates at least three members of the inner shell, and wherein the axial eccentric bores have sealably inserted therein a tubular insert metallically seal at one end and sealed by an O-ring captured in an annular gap at the other end. It is another object of the present invention to provide a rotary coupler for a robot arm which is compact in size yet providing for a plurality of separate noncomingling fluid delivery paths. It is another object of the present invention to provide a rotary coupler adapted for connection to a robot arm having a rotatable wrist providing for the delivery of the plurality of separate distinct fluid paths yet being relatively light in weight. It is still yet another object of the present invention to provide a method to rotatably couple a fluid from a robot arm to an applicator controlled by the robot.

Others objects, desires and advantages of the present invention will become more apparent to those skilled in the art as the nature of the invention is better understood from the accompanying drawings and a detailed description.

DETAILED DESCRIPTION OF THE DRAWINGS

Figure 1:
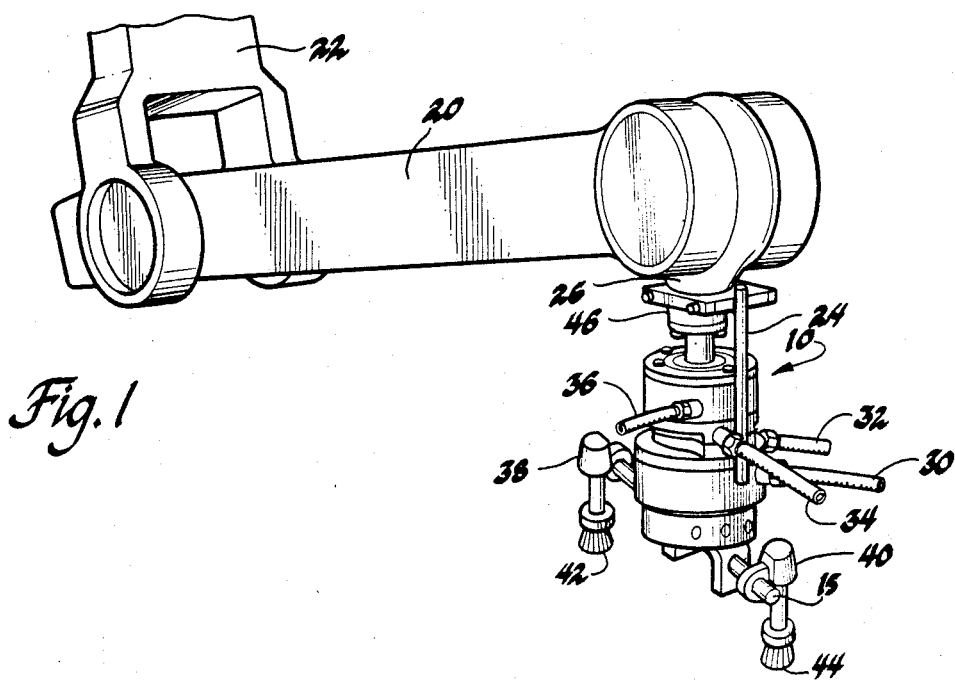
FIG. 1 is a perspective view of the present invention installed on the end of a robot arm.

Referring to FIG. 1, a rotary coupler 10 of the present invention is installed at the end of an arm 20 of a robot 22. The robot has a mounting bracket 24 which restrains rotational movement of a portion of the rotary coupler 10. In an alternative mounting method, (not shown) the rotary coupler 10 may be fixably connected with the end 26 of the robot arm. Feeding into the rotary coupler 10 are various fluid supply lines 30, 32, 34 and 36 respectively. As illustrated in FIG. 1 there is provided two separate primer lines 30 and 32 and two air supply lines 34 and 36.

Mounted on the coupler 10 via mounting bracket 15 opposite the robot arm 20 are two liquid applicators 42 and 44 with corresponding respective pneumatically controlled primer applicator valves 38 and 40. The valves 38 and 40 are connected via the coupler 10 to the separate air supply lines 34 and 36. The applicators 42 and 44 are supplied by the two lines 32 and 30 via coupler 10 and applicator valves 38 and 40. For clarity of illustration the lines connecting the applicators 42 and 44 with separate outlets of the coupler 10 have been deleted. In like manner the air lines from the coupler 10 to the valves 38 and 40 have also been deleted.

The applicators 42 and 44 can be rotated 360 degrees by a robot wrist 46 while the outside of the rotary coupler is rotatively restrained or limited by bracket 24.

Figure 2:
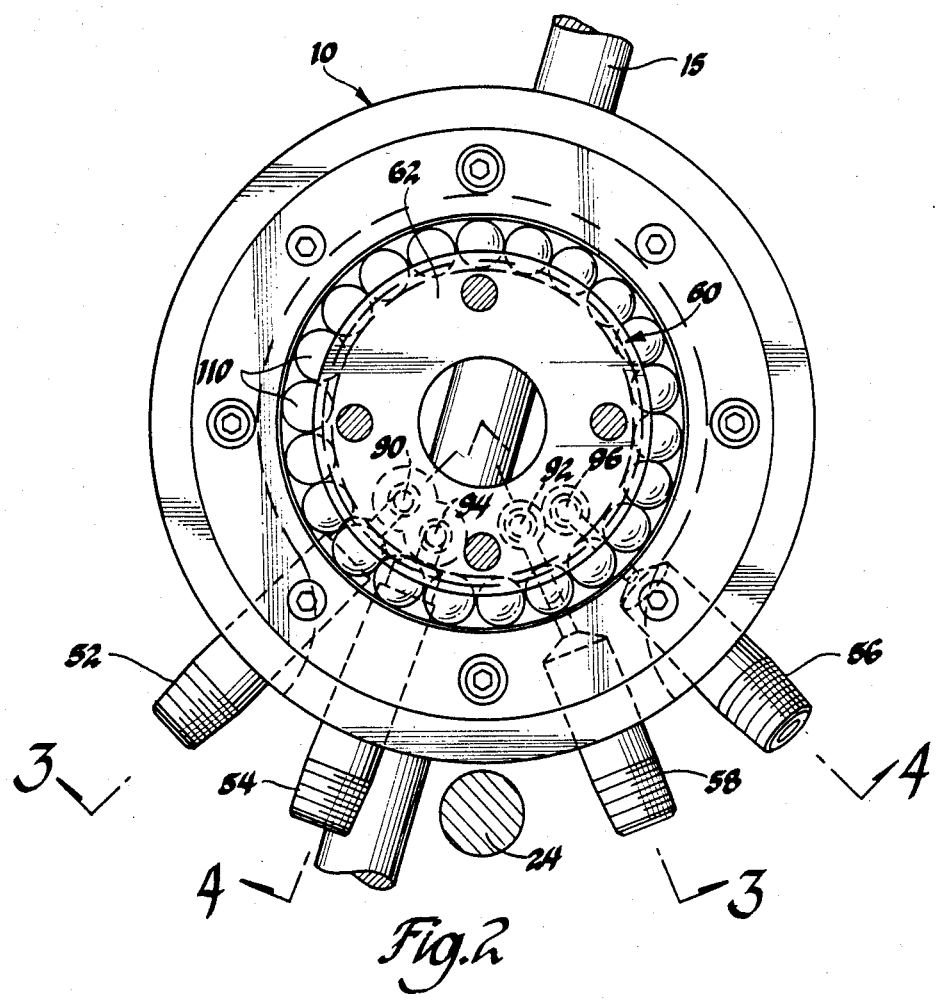
FIG. 2 is a top elevational view of an embodiment of the rotary coupler of the present invention.
Figure 3:
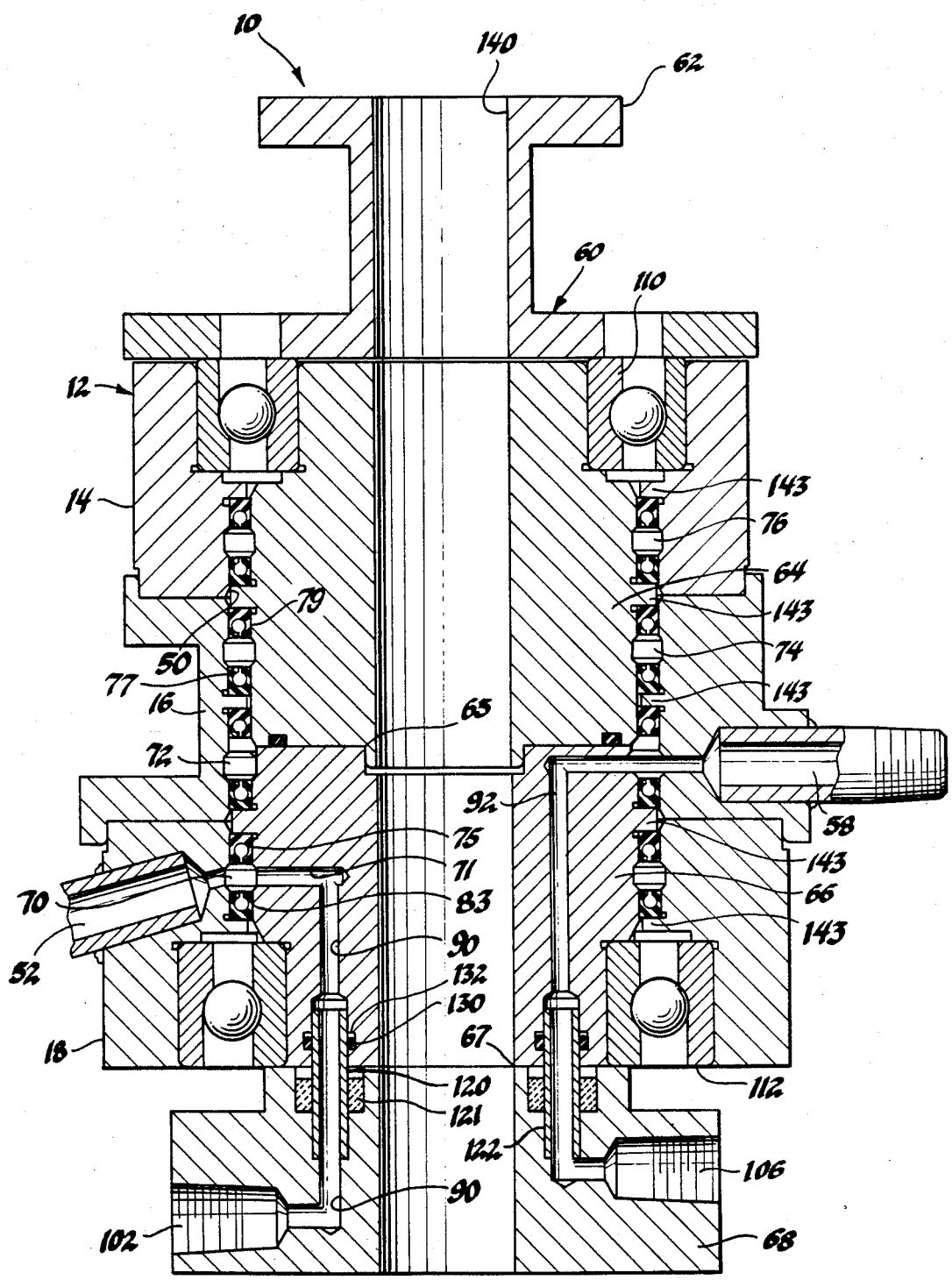
FIG. 3 is a sectional view taken along lines 3—3 of FIG. 2.
Figure 4:
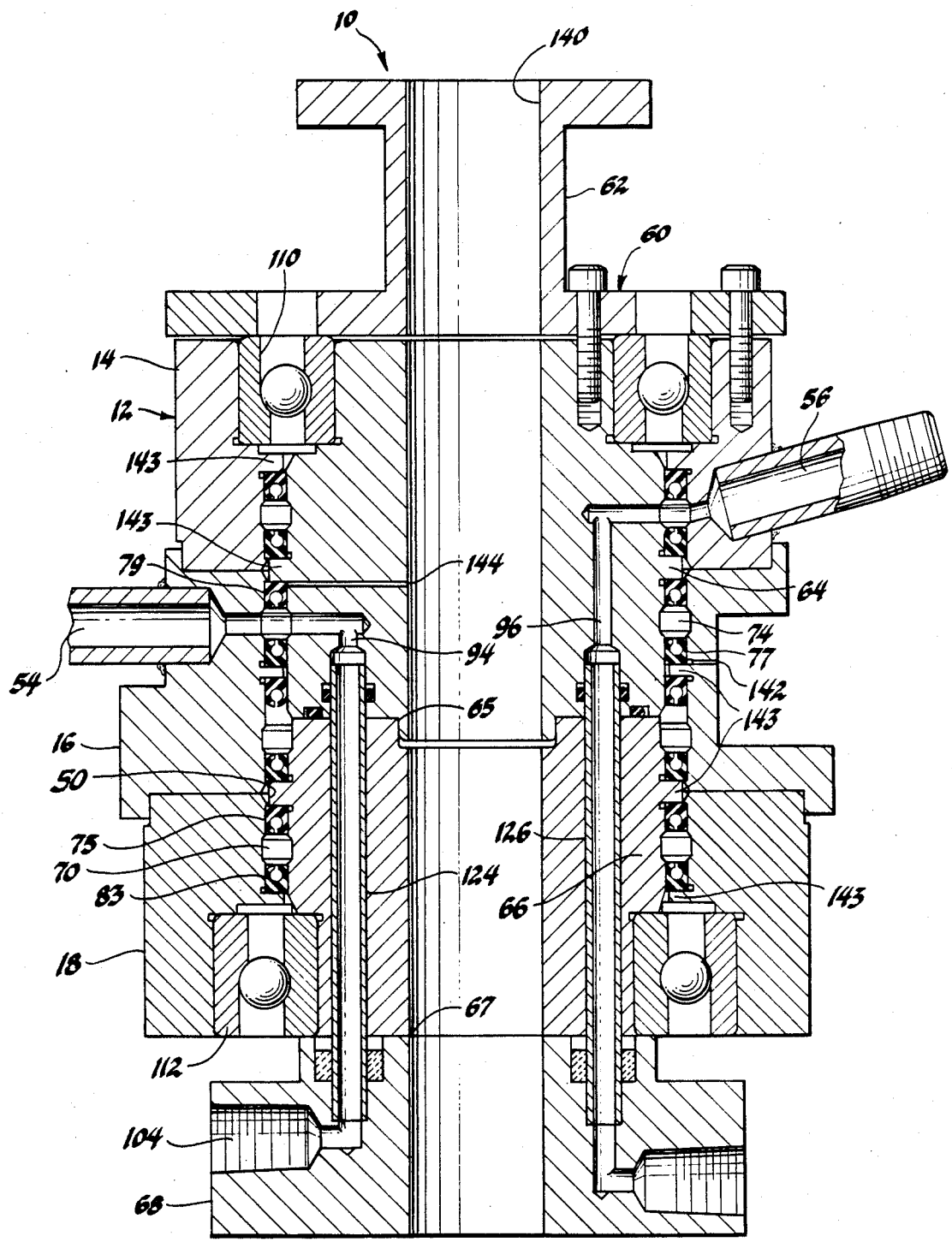
FIG. 4 is a sectional view taken along lines 4—4 of FIG. 2.

Referring to FIGS. 2, 3, and 4 the rotary coupler 10 of the present invention is comprised of three major elements. The first element is an outer shell 12 which is usually rotatably restrained by robot arm and has passing therethrough an inner generally axial bore 50. Allowing passage of fluid to its inner bore 50 from the outside of the outer shell is a plurality of conduits 52, 54, 56 and 58. Although not required, as illustrated in the embodiments of FIGS. 2, 3, and 4, the outer shell 12 is made up of a pluralities of members 14, 16, 18 joined by bolts (not shown).

Rotatably mounted by a pair of axially spaced bearings 110 and 112 within the inner bore 50 of the outer shell is the second major element, multiple piece inner shell 60. As illustrated the inner shell 60 is comprised of four separate members 62, 64, 66 and 68. As illustrated in FIGS. 2 and 3 the inner shell 60 has along its top a flanged tubular connector 62 providing the means of attachment for the coupler 10 to the rotatable wrist 46 of the robot. The separate members of the inner shell are fixably joined by bolts (not illustrated).

Between the inner 60 and outer 12 shell are a plurality of axially separated sealed aperture shaped clearances 70, 72, 74 and 76. The aperture shaped clearances are typically sealed by a pair of axially separated lip seals 75 and 83.

Clearance 70 is fluidly connected with conduit 52. The clearance is also fluidly connected by an internal path 71 with an eccentric axial bore 90 of the first member 66 of the inner shell. The second member 68 of the inner shell also has an axially eccentric bore 90 which aligns with the axial eccentric bore of the first member 66 of the inner shell. This axial eccentric bore 90 feeds out an outlet 102.

The third element of the coupler is the tubular insert 120. The tubular insert is sealably inserted within at least two members of the inner shell 60. Typically the tubular insert 120 will be metallically joined by welding or soldering at 121 to the inner shell member 68 most remote from the robotic arm. On the end of the tubular insert opposite the most remote inner shell member the tubular insert typically will be sealed by an O-ring 130 captured in an annular clearance 132 surrounding the axial eccentric bore 90. By the use of the tubular insert 120 the mating surface 67 of the inner shell members 66 and 68 do not have to be sealed from the axial eccentric bore 90. This configuration is advantageous in that it eliminates complexity and added sealing elements which would be susceptible to wear and failure.

The advantage of the tubular insert is more apparent in FIG. 4 when looking at eccentric axial bores 94 and 96. By use of inserts 124 and 126, double O-ring seals may be eliminated for mating surfaces 65 and 67 around the eccentric axial bores. All of the tubular insets 120, 122, 124 and 126 may be removed by simple removal of inner shell member 68.

The inner shell 60 is made of separate members so that portions of it may be removed to gain access to the interior for maintenance, namely the replacement of the various fluid seals. In the embodiment illustrated in FIGS. 3 and 4 two of the inner shell members 64 and 66, each have two separate noncommingling fluid paths. Typically the inlet nozzles or conduits 52, 54, 56 and 58 to the separate fluid paths will be angularly spaced from one another. Also it is usually preferable that the fluid paths will feed into annular clearances which are aligned on a common diameter. The inner shell and outer shell are configured in such a manner to provide alternating shoulders 143 to capture the separate seal elements.

It is apparent to those skilled in the art that with the use of this design the addition of additional fluid lines can be easily effectuated by the insertion of additional inner and outer shell members. Therefore if desired, the rotary coupler can be designed to be interchangeable with other rotary couplers which provide more or fewer separate noncommingling fluid paths.

A central axial bore 140 is provided to allow the insertion of electrical leads (not shown) which lead to sensors connected with the applicators.

Bleed line 142 shown in FIG. 4 is provided leading from the outside of the outer shell 12 to an area adjacent seal 77 to allow for detection of leakage past the seal. In similar matter bleed line 144 is provided from an area adjacent to seal 79 to the interior bore 140 of the inner shell to allow detection of leakage in and around seal 79.

There is no requirement for this invention that the separate axial eccentric bores 90, 92, 94 and 96 share a common diameter or be equally geometrically spaced from one another. There is no restraint of the present invention that the portion of the inner shell most remote from the robot arm have the fluid outlets 102 and 106.

Figure 5:
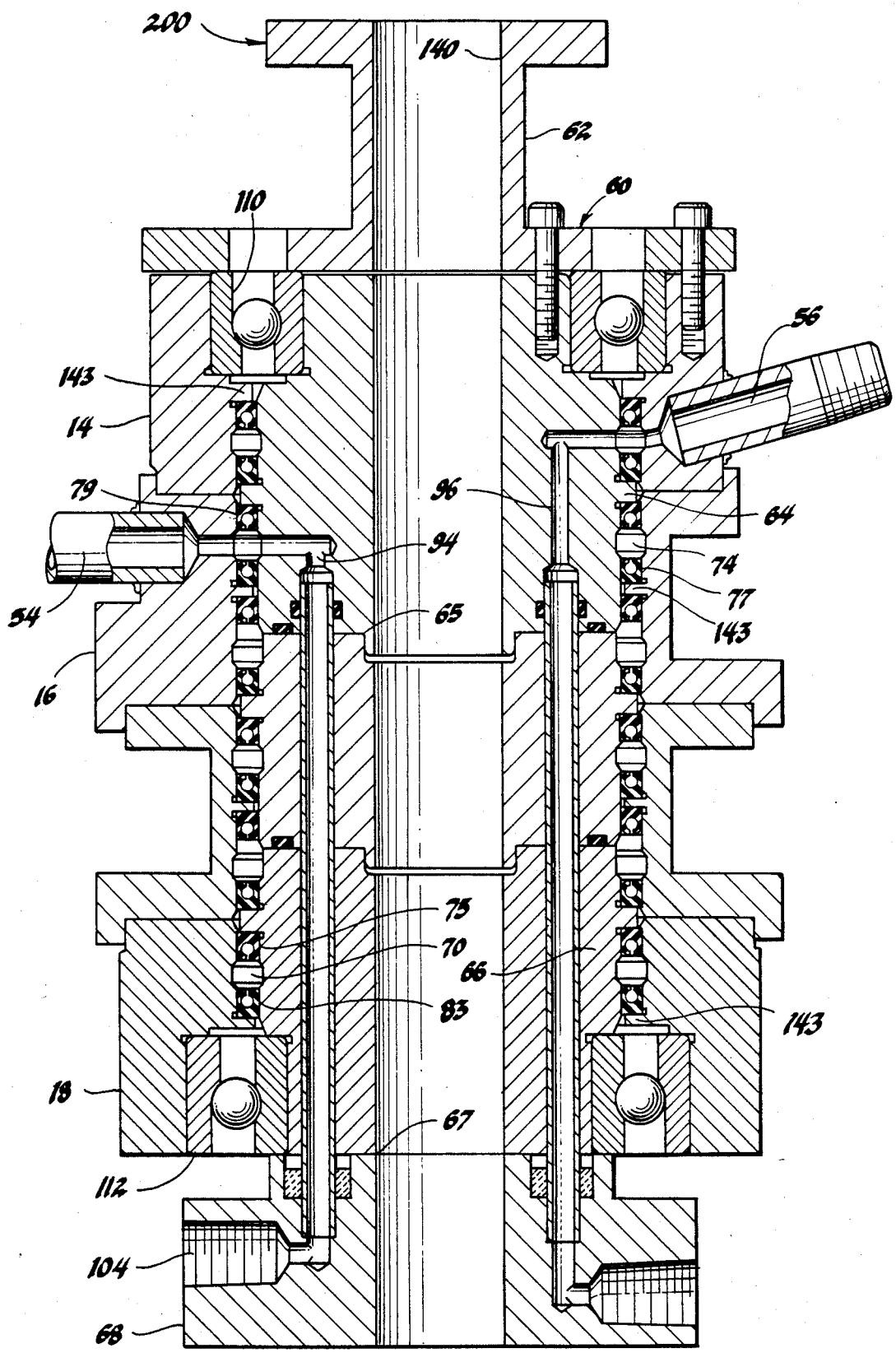
FIG. 5 is a sectional view of another embodiment of the present invention utilized for providing six or more individualized fluid paths.

FIG. 5 illustrates an embodiment of the present invention capable of providing six noncommingling fluid connections. In this embodiment parts common to parts in FIGS. 3 and 4 are given like reference numerals. However it should be noted that the rotary coupler 200 of FIG. 5 is no greater in diameter than that described in FIGS. 2, 3 and 4.

In operation and with reference to FIGS. 1-4 the inner shell member 62 of the rotary coupler 10 is attached to the wrist 46 of the robot. The outer shell 12 of the rotary coupler is restrained by a bracket 24. The robot 22 can now move to its desired position whereby the lines feeding the rotary coupler 10 will experience relatively small amount of relative motion in relation to robot arm 20. The robot wrist 46 is now free to rotate the applicators 42 and 44 as desired.

At fluid inlet nozzle 34 fluid is fed into the rotary coupler 10 and enters a conduit 54 connecting the outside of the coupler with the inner bore 50 of the outer shell. Conduit 54 feeds fluid into the sealed axial angular clearance 74 between the outer shell member and inner shell member. The clearance 74 is fluidly connected with an eccentric axial bore 94 of the inner shell. The fluid then exits via outlet 104 which is located in the inner shell member 68 most remote from the robot arm. Inner shell 60 may freely rotate and it will still keep fluid communication with the conduit 54 due to the annular 74 clearance. Sealable mounted tubular insert 124 prevents the fluid from escaping out mating surfaces 67 and 65.

While in the embodiments shown the outer shell 12 is fixably attached via bracket 24 with the robot arm 20 to restrain the torsional rotation. If desired the bracket 24 may be deleted and the outer coupling shell may be allowed to rotate freely restrained only by the force exerted upon it by the various fluid supply lines.

The method of the present invention in rotatably coupling a fluid from a robot arm to an applicator controlled by said robot includes the following steps:

1. Communicating a fluid through a conduit 52 in an axially bored outer shell 12.
2. Axially sealing 75, 83 the fluid between the outer shell 12 and a multipiece inner shell 60 rotatably mounted therein in an annular shaped clearance in communication with the conduit.
3. Communicating the fluid from the clearance through an eccentric axial bore in the inner shell 60.
4. Sealing the eccentric axial bore 90 with a tubular insert 120 sealed within at least two members of the inner shell 60.

While two embodiments of the present invention have been explained it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A rotary coupler for a robot arm comprising:
   an outer shell having an inner bore fluidly connected with the outside of said outer shell via a first conduit;
   a first inner shell rotatably mounted within said outer shell having a first generally annular sealed clearance with said outer shell, said annular clearance being fluidly connected with said first conduit, and said first inner shell having a first eccentric axial bore fluidly connected with said annular clearance and said eccentric axial bore having a concentric annular gap;
   at least a second inner shell fixedly connected with said first inner shell and having an extension of said first eccentric axial bore aligned therewith; and
   a tubular insert sealed by a surrounding O-ring captured in said concentric annular gap adjacent an end of said tubular insert, said tubular insert being mounted within said first eccentric axial bore whereby said second inner shell may be removed from its fixable connection with said first inner shell.

2. A coupler as described in claim 1 further including said first inner shell having a second annular sealed clearance with said outer shell fluidly connected with the outside of said outer shell via a second conduit, and said first and second inner shells having a second eccentric axial bore, said second eccentric axial bore in said first inner shell having a second concentric annular gap, and said coupler having a second tubular insert sealed by a surrounding O-ring captured in said second concentric annular gap adjacent an end of said second tubular insert, said second tubular insert being fluidly connected with said second annular clearance.

3. A rotary coupler as described in claim 1 wherein said inner shells have an inner axial bore.

4. A rotary coupler as described in claim 1 wherein said robot has a rotatable wrist further including means of attachment of said inner shells to said robot wrist allowing said robot to rotate said inner shell.

5. A rotary coupler as described in claim 4 further including means of attachment allowing limited rotation of said outer shell with respect to said robot arm.

6. A rotary coupler as described in claim 1 wherein said tubular insert is metallically joined with said second inner shell.

7. A rotary coupler as described in claim 1 further including a bleed hole from the outside of said outer shell to an area adjacent to said first annular sealed clearance to allow detection of leakage past said first annular sealed clearance.

8. A rotary coupler as described in claim 3 further including a bleed hole from said axial bore of said inner shell to an area adjacent to said first annular sealed clearance to allow detection of leakage past said first annular sealed clearance.

9. A rotary coupler as described in claim 1 wherein said first annular sealed clearance is sealed by a pair of axially separated lip seals captured by alternating shoulders of said inner and outer shells.

10. A rotary coupler as described in claim 1 wherein said inner shell is rotatably mounted within said outer shell by means of a first bearing.

11. A rotary coupler as described in claim 10 further including a second bearing between said inner and outer shell axially spaced from said first bearing.

12. A rotary coupler for a robot arm comprising:
    an outer shell having an inner bore fluidly connected with the outside of said outer shell via noncommingling first and second conduits;
    a first inner shell rotatably mounted within said outer shell and having first and second generally annular sealed clearances with said outer shell, said annular clearances being fluidly connected with said first and second conduits respectively; and
    said first inner shell having a first and second eccentric axial bores with concentric annular gaps, said first and second eccentric axial bores being fluidly connected with said first and second annular clearances respectively;

at least a second inner shell fixably connected with said first inner shell and having first and second extensions of said first and second eccentric axial bores aligned therewith; and first and second tubular inserts mounted within said first and second eccentric axial bore respectively and sealed by a surrounding O-ring captured in said respective annular gap adjacent an end of said tubular inserts whereby said second inner shell may be removed from its fixable connection with said first inner shell.

13. A rotary coupler as described in claim 12 wherein said first and second generally annular sealed clearances are aligned on a common diameter.

14. A rotary coupler as described in claim 12 said rotary coupling further including a third inner shell fixedly connected with said first inner shell opposite said second inner shell, said third inner shell having an annular sealed third clearance with said outer shell in fluid communication with the outside of said outer shell via a third conduit, and said first, second, and third inner shells having an third eccentric axial bore therethrough fluidly connected with said third annular sealed clearance and said third shell having a third annular gap concentric with said third eccentric axial bore and asid coupler having a third tubular insert mounted in said third axial bore sealed by a surrounding O-ring captured in said third annular gap.

15. A multiple fluid stream rotary coupler for a robot arm comprising:
 an outer shell with an inner bore, said inner bore having a plurality of axially separated noncommingling conduits fluidly connecting said inner bore with the outside of said shell;
 a fixably connected multiple member inner shell rotatably mounted within said outer shell having a plurality of axially separated generally annular sealed clearances individually fluidly connected with said noncommingling conduits, and said inner shell having a plurality of eccentric axial bores having annular concentric gaps and being individually fluidly connected with a respective annular sealed clearance; and
 a plurality of tubular inserts inserted within said respective eccentric axial bores sealed by a surrounding O-ring captured in said annular gaps adjacent an end of said tubular inserts whereby at least one of said inner shell members may be removed from its fixable connection with another said member of said inner shell.

16. A rotary coupler as described in claim 15 wherein said inner and outer shells are mounted by means of a bearing.

17. A rotary coupler as described in claim 15 wherein said outer shell is fabricated from a plurality of axially separated members fixably connected to one another.

18. A rotary coupler as described in claim 15 wherein said inner shell has an axial bore therethrough.

19. A rotary coupler as described in claim 15 wherein said robot has a rotatable wrist and wherein said inner shell has means of attachment to said rotatable wrist of said robot.

20. A rotary coupler as described in claim 15 wherein said annular clearances are aligned on a common diameter.

21. A rotary coupler as described in claim 15 wherein said inner shell has at least three members and at least two of said members have a plurality of eccentric axial bores communicating with a plurality of axially separated generally annular sealed clearances which are individually fluidly connected with a respective conduit.

22. A method of rotatably coupling a fluid from a robot arm to an applicator controlled by said robot comprising:
 communicating a fluid through a conduit in an axially bored outer shell;
 axially sealing said fluid between said outer shell and a multiple member inner shell rotatably mounted therein in an annular shaped clearance in communication with said conduit;
 communicating said fluid from said clearance through an eccentric axial bore having a concentric annular gap in said inner shell; and
 sealing said eccentric axial bore with a tubular insert surrounded adjacent one end by an O-ring in said annular gap in one member of said inner shell and sealed at another end in at least a second member of said inner shell.

* * * * *